US008989664B2

(12) United States Patent
Okinoi et al.

(10) Patent No.: US 8,989,664 B2
(45) Date of Patent: Mar. 24, 2015

(54) PORTABLE DEVICE

(75) Inventors: Masanori Okinoi, Kanagawa (JP);
Takuya Mikami, Kanagawa (JP);
Mohamed Thaheer Ahmad Shaheer,
Osaka (JP); Tomiyuki Yamada,
Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 268 days.

(21) Appl. No.: 13/301,229

(22) Filed: Nov. 21, 2011

(65) Prior Publication Data

US 2012/0071099 A1 Mar. 22, 2012

Related U.S. Application Data

(63) Continuation of application No. PCT/JP2009/005960, filed on Nov. 9, 2009.

(30) Foreign Application Priority Data

May 21, 2009 (JP) ................................ P2009-123172

(51) Int. Cl.
*H04B 7/00* (2006.01)
*H04M 1/725* (2006.01)
(Continued)

(52) U.S. Cl.
CPC ............. *H04M 1/72527* (2013.01); *G06K 7/00* (2013.01); *G06K 19/0703* (2013.01); *H04M 1/7253* (2013.01); *H04W 52/0277* (2013.01)
USPC ..... 455/41.2; 455/550.1; 455/558; 455/552.1

(58) Field of Classification Search
CPC ..................... H04M 1/7253; H04M 1/274516; H04M 1/72525; H04M 1/72552; H04M 1/72527; H04M 1/72575; H04M 3/567; H04W 4/008; H04W 76/023; H04W 4/023; H04W 52/0277; H04W 72/1215

USPC ........................................................ 455/41.2
See application file for complete search history.

(56) References Cited

U.S. PATENT DOCUMENTS 7,184,706 B2 * 2/2007 Someya et al. ............... 455/41.2
2006/0229027 A1 * 10/2006 Wang et al. ...................... 455/73
(Continued)

FOREIGN PATENT DOCUMENTS

JP 2001-309027 11/2001
JP 2004-336231 11/2004
(Continued)

OTHER PUBLICATIONS

IT media, Vertically separable "Separable portable phone" released by Docomo, [online], Sep. 30, 2008; updated at 17:54, IT media Co., Ltd., [searched on Dec. 10, 2008] on the Internet <URL:http://plusd.itmedia.co.jp/mobile/articles/0809/30/news094.html>.
(Continued)

*Primary Examiner* — Ajibola Akinyemi
(74) *Attorney, Agent, or Firm* — McDermott Will & Emery LLP

(57) ABSTRACT

When a first module and a second module of a plurality of modules 110 to 150 perform authentication processing through short range communication, the first module detects remaining capacity of its own battery 101. When the remaining capacity surpasses a predetermined level, electric power for use in performing authentication operation is supplied to the second module. The plurality of modules, perform authentication processing through short range communication as mentioned above. In addition, individual function units of the respective modules are activated, whereby one function is implemented as a whole. Such a portable device can be made operable on electrical power of a battery for a long hour without impairing convenience of the device.

27 Claims, 13 Drawing Sheets

(51) Int. Cl.
 *G06K 7/00* (2006.01)
 *G06K 19/07* (2006.01)
 *H04W 52/02* (2009.01)

(56) References Cited

U.S. PATENT DOCUMENTS

2009/0278488 A1* 11/2009 Choi et al. .................. 320/103
2013/0176115 A1* 7/2013 Puleston et al. ........... 340/10.51

FOREIGN PATENT DOCUMENTS

JP  2007-082148  3/2007
WO  WO 2008/059564 A1  5/2008

OTHER PUBLICATIONS

International Search Report issued in International Patent Application No. PCT/JP2009/005960 dated Dec. 15, 2009.

* cited by examiner

PORTABLE DEVICE

RELATED APPLICATIONS

This application is a continuation of PCT International Application PCT/JP2009/005960 filed on Nov. 9, 2009, which claims priority to Japanese Patent Application No. 2009-123172 filed on May 21, 2009. The disclosures of these applications including the specifications, the drawings, and the claims are hereby incorporated by reference in their entirety.

BACKGROUND OF THE INVENTION

1. Field of the Invention

The present invention relates to a portable device equipped with a plurality of module units having non-contact short-range communication capability in which the module units respectively perform functions by means of performing authentication processing through non-contact short range communication, thereby fulfilling one function as a whole and, more particularly, a technique for feeding power to the module units to perform authentication processing.

2. Description of the Related Art

FIG. 14 shows a block diagram showing a portable device having a plurality of modules. The "module units" are hereunder described simply as "modules." A portable device 10 shown in FIG. 14 includes an application processing module 11, an input module 12, an acoustic module 13, a communication module 14, and a display module 15.

The application processing module 11 has an application processing function unit (an individual function unit) 111 for performing processing in order to carry out various application functions of the portable device 10. The input module 12 has an input processing function unit (an individual function unit) 112 including an input device, like a keyboard and a touchpad. The acoustic module 13 includes a speaker 113a, a microphone 113b, and an acoustic function unit (an individual function unit) 113 that performs audio input/output processing and control of the speaker and the microphone. The communication module 14 has a communication function unit (an individual function unit) 114 including a base band circuit, an RF (Radio Frequency) processing circuit, and the like. The display module 15 has a display unit (an individual function unit) 115 including a display unit using liquid crystal, organic EL, and the like, and a display control circuit that controls activation of the display unit. In addition to the respective individual function units 111 to 115, the respective modules 11 to 15 are equipped with short range communication units 12a to 12e for establishing short range communication with the other modules in a non-contacting manner and batteries 11a to 11e that feed electric power to respective units in the respective modules.

The portable device 10 shown in FIG. 14 performs authentication processing among the modules 11 to 15 through non-contact short range communication as pre-processing for letting the individual function units 111 to 115 of the respective modules 11 to 15 act as a whole, to thus make one function feasible. However, the related art portable device 10 must keep the modules 11 to 15 enable performance of authentication processing at all times. For this reason, the short range communication units 12a to 12e of the respective modules 11 to 15 remain operative at all times. The remaining capacity of the respective batteries 11a to 11e implemented in the respective modules 11 to 15 decreases for this reason, which raises a problem of shortening of an operable time (see Non-Patent Document 1).

Non-patent Document 1: IT media, "Vertically separable "Separable portable phone" released by Docomo, [online], Sep. 30, 2008; updated at 17:54, IT media Co., Ltd., [searched on Dec. 10, 2008] on the Internet <URL:http://plusd.itmedia.co.jp/mobile/articles/0809/30/news094.html>

SUMMARY OF THE INVENTION

Since the modules 11 to 15 are held at all times so as to be able to perform authentication processing, the remaining capacity of the batteries 11a to 11e decreases, which shortens an operable time of the portable device 10. The problem can be resolved by use of batteries of large capacity as the batteries 11a to 11e of the respective modules 11 to 15. However, since an increase in dimensions of the batteries 11a to 11e is incidental to enhancement of battery capacity, dimensions of the respective modules 11 to 15 also become greater. As a consequence, the portable device 10 having the plurality of modules 11 to 15 also becomes greater, so that convenience of the portable device is impaired.

Another means of resolution is to provide each of the modules 11 to 15 with a power switch for manually turning on or off electric power feed to the short range communication units 12a to 12e for authentication processing. According to the configuration, it is conceivable that the power switches will be turned on or off only when authentication processing is required in such a way that the short range communication units 12a to 12e will be supplied with electric power, thereby curtailing the electric power dissipated to maintain an authentication-enabled state. However, performing operation for turning on or off the power switches of the respective modules 11 to 15 every time authentication is performed is very laborious.

An objective of the present invention is to provide a portable device capable of operating for a long hour by means of a supply of electric power from a battery without impairing convenience of the portable device as well as to provide a power supply method implemented by the portable device and module units employed in the portable device.

The present invention provides a portable device including a plurality of modules each of which has a battery, an individual function unit configured to operate by electric power stored in the battery and exhibit individual functions, and a short range communication unit configured to perform authentication processing through non-contact communication, wherein, when a first module and a second module of the plurality of modules perform authentication processing through non-contact short range communication, the first module detects remaining capacity of its own battery; and wherein, when the remaining capacity surpasses a predetermined level, electric power for use in performing authentication operation is supplied to the second module.

In the portable device, it is desirable that, in addition to including the battery storing the electric power used for activating the individual function unit, the first module have an authentication operation battery for activating the short range communication unit; that, when non-contact short range communication is established with the second module, remaining capacity of the authentication operation battery be detected; and that, when the remaining capacity surpasses a predetermined level, the electric power used for performing authentication operation be fed from the authentication operation battery to the second module.

In the portable device, it is desirable that each of the first module and the second module detect remaining capacity of the battery of the module; that information about the remaining capacity be exchanged between the first module and the second module through non-contact short range communication; and that, when remaining capacity of the battery of one module is greater than remaining capacity of the battery of the other module, the module supply the other module with electric power used for performing authentication operation. In this case, it is desirable that the module preferably have a switch used for making a switch as to whether or not to make it possible for the module to supply the electric power for performing authentication operation to the other module.

In the portable device, it is desirable that, after having supplied the electric power from the battery of the first module to the second module, to thus perform authentication processing, the first module use the electric power stored in the battery of the first module for operation of the first module.

In the portable device, it is desirable that the module have a switch for shutting off a supply of electric power to the short range communication unit belonging to the module when authentication operation does not need to be performed.

The present invention provides a portable device including a plurality of modules each of which has a battery, an individual function unit configured to operate by electric power stored in the battery and exhibit individual functions, and a short range communication unit configured to perform authentication processing through non-contact communication, wherein at least one of the plurality of modules includes an authentication power supply module; and wherein, when a first module and a second module, among the plurality of modules, perform authentication processing through non-contact short range communication, the authentication power supply module supplies electric power for authentication operation to at least one of the first module and the second module.

In the portable device, it is desirable that, when a result of authentication of the second module shows that the second module has already been authenticated, the first module can cancel authentication of the second module.

In the portable device, it is desirable that, when a result of authentication of the second module shows that the second module is disapproved, the first module transmit a disable command to the second module and that, when received the disable command, the second module shut off a supply of electric power from the battery of the second module.

The present invention also provides an electric power supply method performed by a portable device including a plurality of modules each of which has a battery, an individual function unit configured to operate from electric power stored in the battery and exhibit individual functions, and a short range communication unit configured to perform authentication processing through non-contact communication, wherein, when a first module and a second module of the plurality of modules perform authentication processing through non-contact short range communication, the first module detects remaining capacity of its own battery; and wherein, when the remaining capacity surpasses a predetermined level, electric power for use in performing authentication operation is supplied to the second module.

Under the electric power supply method, it is desirable that, in addition to including the battery storing the electric power used for activating the individual function unit, the first module have an authentication operation battery for activating the short range communication unit; that, when non-contact short range communication is established with the second module, remaining capacity of the authentication operation battery be detected; and that, when the remaining capacity surpasses a predetermined level, the electric power used for performing authentication operation be fed from the authentication operation battery to the second module.

Under the electric power supply method, it is desirable that each of the first module and the second module detect remaining capacity of the battery of the module; that information about the remaining capacity be exchanged between the first module and the second module through non-contact short range communication; and that, when remaining capacity of the battery of one module is greater than remaining capacity of the battery of the other module, the module supply the other module with electric power used for performing authentication operation. In this case, it is desirable that the module have a switch used for making a switch as to whether or not to make it possible for the module to supply the electric power for performing authentication operation to the other module.

Under the electric power supply method, it is desirable that, after having supplied the electric power from the battery of the first module to the second module, to thus perform authentication processing, the first module use the electric power stored in the battery of the first module for operation of the first module.

Under the electric power supply method, it is desirable that the module shut off a supply of electric power to the short range communication unit belonging to the module when authentication operation does not need to be performed.

The present invention also provides an electric power supply method performed by a portable device including a plurality of modules each of which has a battery, an individual function unit configured to operate from electric power stored in the battery and exhibit individual functions, and a short range communication unit configured to perform authentication processing through non-contact communication, wherein at least one of the plurality of modules includes an authentication power supply module; and wherein, when a first module and a second module, among the plurality of modules, perform authentication processing through non-contact short range communication, the authentication power supply module supplies electric power for authentication operation to at least one of the first module and the second module.

Under the electric power supply method, it is desirable that, when a result of authentication of the second module shows that the second module has already been authenticated, the first module can cancel authentication of the second module.

Under the electric power supply method, it is desirable that, when a result of authentication of the second module shows that the second module is disapproved, the first module transmit a disable command to the second module and that, when received the disable command, the second module shut off a supply of electric power from the battery of the second module.

The present invention also provides a module for use in a portable device including a plurality of modules each of which has a battery, an individual function unit configured to operate by an electric power stored in the battery and exhibit individual functions, and a short range communication unit configured to perform authentication processing through non-contact communication, wherein remaining capacity of a battery of one module is detected when authentication of another module is performed; and wherein, when the remaining capacity surpasses a predetermined level, electric power for performing authentication operation is supplied to the other module.

In the module, it is desirable that, in addition to including the battery storing the electric power used for activating the individual function unit, each of the modules have an authentication operation battery for activating the short range communication unit; that, when non-contact short range communication is established with the other module, remaining capacity of the authentication operation battery be detected; and that, when the remaining capacity surpasses a predetermined level, the electric power used for performing authentication operation be fed from the authentication operation battery to the other module.

In the module, it is desirable that remaining capacity of a battery of a module of interest be detected; that information about the remaining capacity be exchanged with another module through non-contact short range communication; and that, when the remaining capacity of the battery of the module of interest is greater than remaining capacity of the battery of the other module, the module supply the other module with electric power used for performing authentication operation. In this case, it is desirable that the module further comprise a switch used for making a switch as to whether or not to make it possible for the module of interest to supply the electric power for performing authentication operation to the other module.

In the module, it is desirable that, after having supplied the electric power from the battery of the module of interest to the other module, to thus perform authentication processing, the module of interest use the electric power stored in the battery of the module of interest for operation of the module of interest.

It is desirable that the module further comprise a switch for shutting off a supply of electric power to the short range communication unit belonging to the module of interest when authentication operation does not need to be performed.

The present invention provides a module for use in a portable device including a plurality of modules each of which has a battery, an individual function unit configured to operate by electric power stored in the battery and exhibit individual functions, and a short range communication unit configured to perform authentication processing through non-contact communication, wherein, when a first module and a second module other than a module of interest perform authentication processing through non-contact short range communication, electric power for authentication operation is supplied to at least one of the first module and the second module.

In the module, it is desirable that, when a result of authentication of the other module shows that the other module has already been authenticated, authentication of the other module can be cancelled.

In the module, it is desirable that, when a result of authentication of the other module shows that the other module is disapproved, a command for disabling use of the other module be transmitted to the other module.

According to the present invention, there is provided a portable device including a plurality of modules in which the modules perform authentication processing through non-contact short range communication, to thus activate individual function units of the modules and implement one function as a whole. A module whose battery has larger remaining capacity supplies another module whose battery has smaller remaining capacity with electric power for performing authentication operation. Authentication processing is carried out among the modules by efficient use of the electric power stored in batteries implemented in the respective modules. The portable device can thereby be used for a long hour on the electric power stored in the batteries without impairing convenience of the portable device.

DETAILED OF THE PREFERRED EMBODIMENTS

Embodiments of the present invention are hereunder described by reference to the drawings.

First Embodiment

Figure 1:
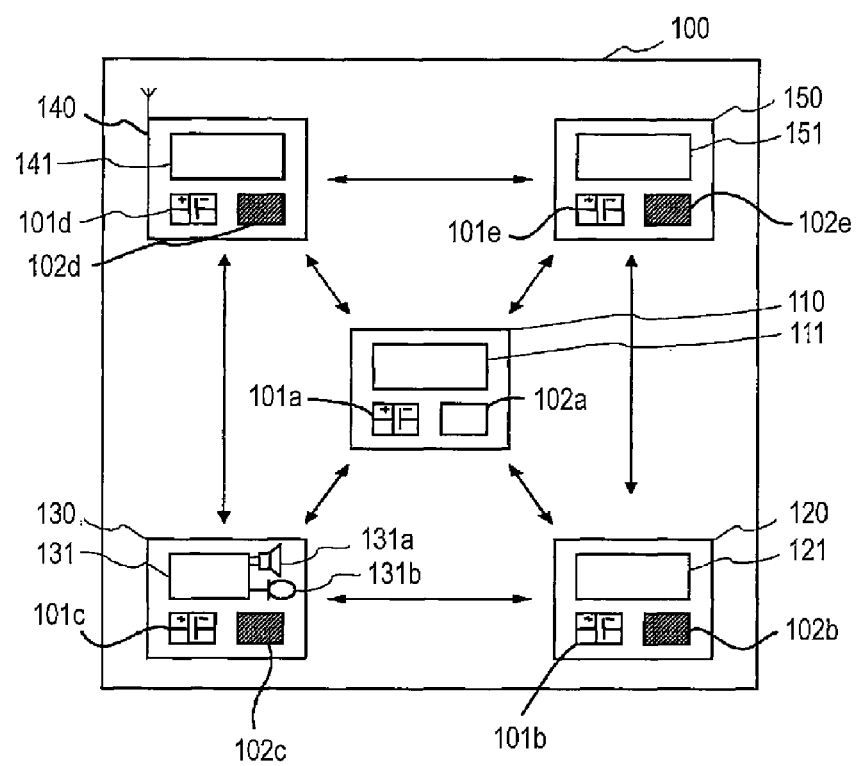
FIG. 1 shows a block diagram showing a portable device of a first embodiment of the present invention.

FIG. 1 shows a block diagram showing a portable device 100 of a first embodiment. Module units are hereunder simply described as "modules." The portable device 100 shown in FIG. 1 includes an application processing module 110; an input module 120; an acoustic module 130; a communication module 140; and a display module 150.

The application processing module 110 has an application processing function unit (an individual function unit) 111 for materializing various application functions of the portable device 100. The input module 120 has an input processing function unit (an individual function unit) 121 including an input device, like a keyboard and a touchpad. The acoustic module 130 has an acoustic function unit (an individual function unit) 131 including a speaker 131a, a microphone 131b, and an audio input/output circuit for processing and controlling audio input/output operations performed by the speaker and the microphone. The communication module 140 has a communication function unit (an individual function unit) 141 including a base band circuit, an RF (Radio Frequency) processing circuit, and the like. The display module 150 has a display unit (an individual function unit) 151 including a display device using liquid crystal, organic EL, and the like, and a display control circuit that controls activation of the display device. In addition to the respective individual function units 111 to 151, the respective modules 110 to 150 are equipped with short range communication units 102a to 102e for establishing short range communication with the other modules in a non-contacting manner and batteries 101a to 101e for supplying electric power to respective units in the modules.

Figure 2:
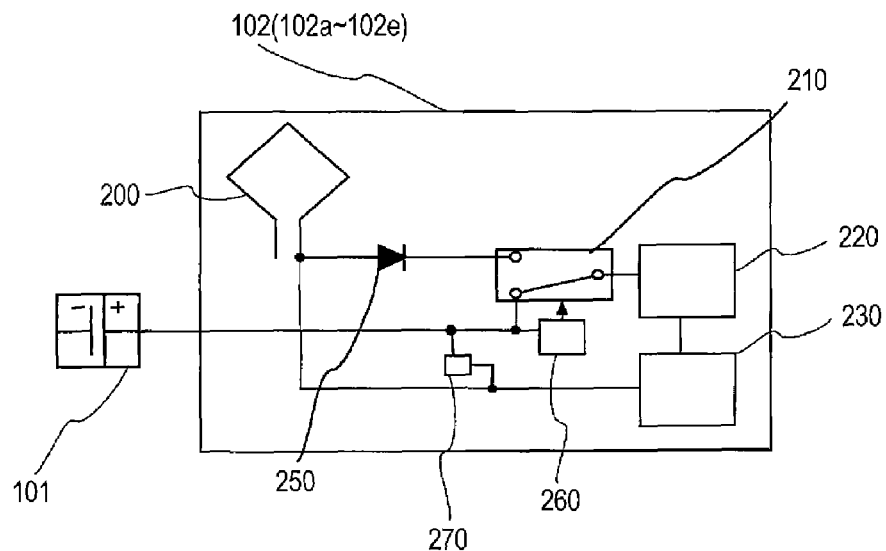
FIG. 2 shows a block diagram showing a short range communication unit of the first embodiment.

FIG. 2 shows a block diagram showing the short range communication units 102 (102a to 102e) implemented in the respective modules 110 to 150 making up the portable device 100 of the first embodiment. As shown in FIG. 2, the short range communication unit 102 has a power supply short-range communication antenna (hereinafter called simply an "antenna") 200, a short range communication unit 230, a remaining battery-capacity detection unit 260, and a power feed control unit 270. The antenna 200 acts as a power supply antenna by means of which the modules supply electric power for authentication operation purpose to each other through spatial transmission and also as a communication antenna by means of which the modules perform authentication operation through non-contact short range communication. The short range communication unit 230 is usually supplied with electric power from the battery 101. When the short range communication unit 230 is supplied with electric power from another module, the electric power received by the antenna 200 is rectified by a rectifier diode 250. The thus-rectified electric power is supplied to the short range communication unit 230 by way of a power changeover switch 210 and a power stabilization unit 220. The remaining battery-capacity detection unit 260 detects remaining capacity of the battery 101. The power feed control unit 270 performs processing required when electric power is supplied to another module.

Figure 3:
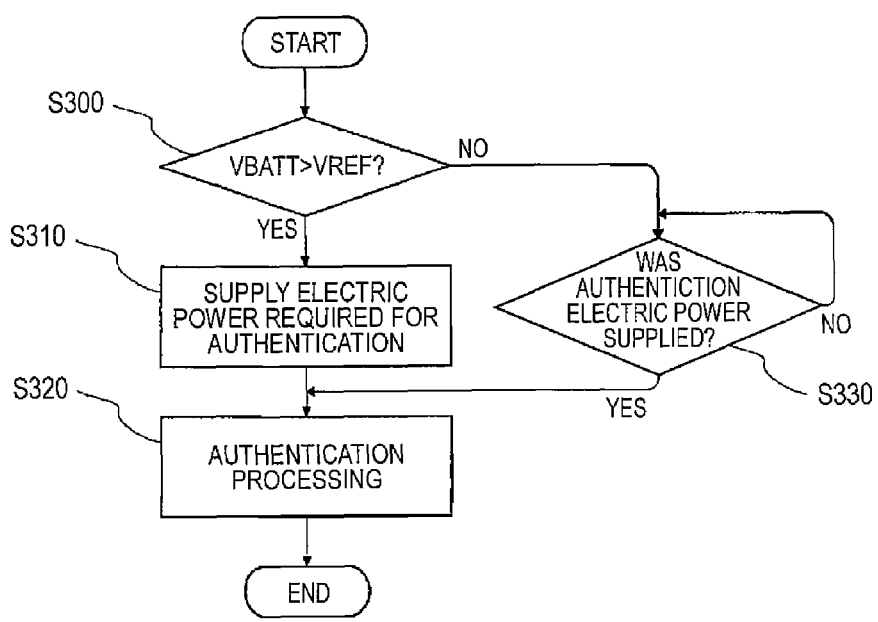
FIG. 3 shows a flowchart showing processing performed by the short range communication unit of the first embodiment.

FIG. 3 shows a flowchart showing processing performed by the short range communication unit 102 of the first embodiment. When the short range communication unit 102 starts operation, the remaining battery-capacity detection unit 260 performs remaining capacity check processing of the battery 101 (step S300). During the period of remaining battery-capacity check processing (step S300), it is determined whether or not remaining battery-capacity (VBATT) surpasses a threshold value (VREF). As a consequence, when the remaining battery-capacity (VBATT) surpasses the threshold value (VREF) (YES in step S300), the power feed control unit 270 supplies electric power to the other module during authentication (step S310). Subsequently, the short range communication unit 230 performs authentication processing (step S320). In the meantime, when a result of remaining battery-capacity check processing (step S300) shows that the remaining battery-capacity (VBATT) does not surpass the threshold value (VREF) (NO in step S300), processing proceeds to authentication power supply wait processing (step S330), where processing waits until authentication electric power is supplied from another module. When the authentication electric power is supplied from another module (YES in step S330), authentication processing is performed (step S320).

According to the present embodiment, when a first module and a second module among the plurality of modules 110 to 150 (five modules) making up the portable device 100 perform authentication processing through non-contact short range communication, the short range communication unit 102 of the first module detects remaining capacity of its own battery 101. When the remaining capacity surpasses a predetermined level, the electric power for performing authentication operation can be supplied to the second module. Thus, the electric power for performing authentication operation is supplied from the module whose battery 101 has greater remaining capacity to the module whose battery 101 has smaller remaining capacity. Authentication operation performed among the modules can be performed while the electric power stored in the batteries mounted in the respective modules is efficiently used. Therefore, the portable device can be used for a long period of time by means of the electric power stored in the batteries without impairing convenience of the portable devices.

In the present embodiment, one antenna 200 is used for transmitting and receiving electric power and short range communication. However, there may also be adopted a configuration in which the electronic device has one antenna for transmitting and receiving electric power and another antenna for short range communication.

Second Embodiment

Figure 4:
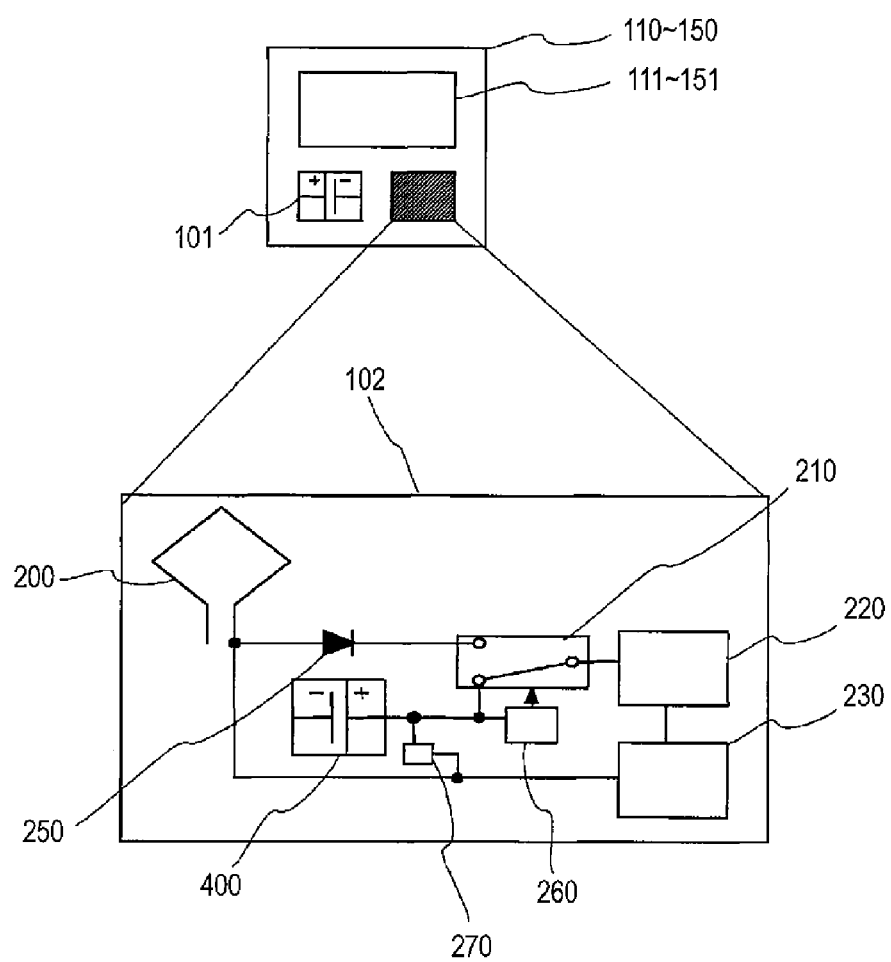
FIG. 4 shows a block diagram of the module and the short range communication unit of the module of a second embodiment.

FIG. 4 shows a block diagram of the modules 110 to 150 and their short range communication units 102 (102a to 102e) of a second embodiment. In addition to the batteries 101 storing electric power for activating the individual function units 111 to 151, the portable device 100 of the second embodiment has in the respective modules 110 to 150 authentication operation batteries 400 for activating the short range communication units 102. The remaining battery-capacity detection unit 260 detects remaining electric power of the authentication operation battery 400. When non-contact short range communication is established with another module, the power feed control unit 270 of a module of interest detects remaining capacity of its own authentication operation battery 400. When the remaining capacity surpasses the predetermined level, the power feed control unit of the module of interest performs control operation for supplying electric power for authentication operation to the other module from the authentication operation battery 400 of the module of interest.

Figure 5:
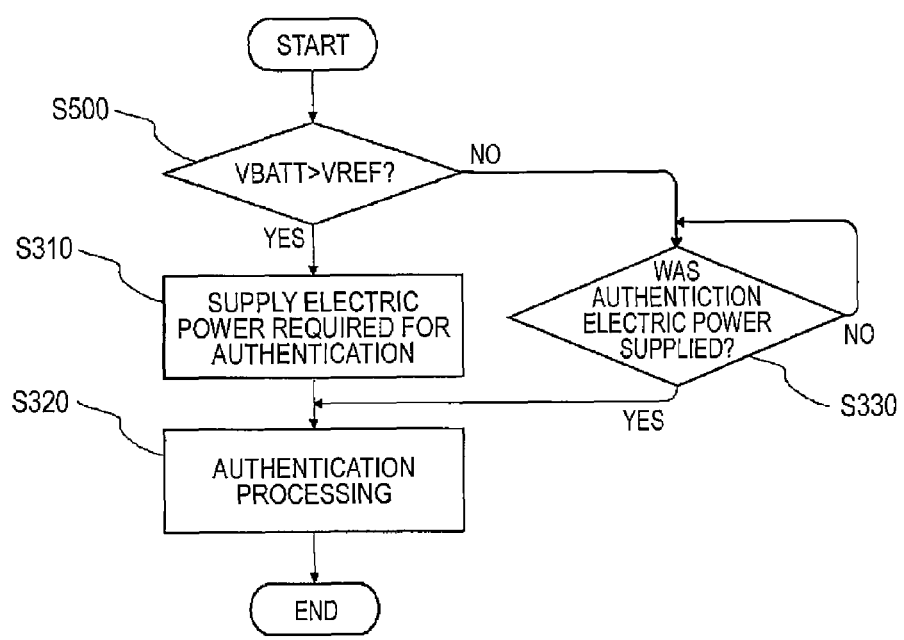
FIG. 5 shows a flowchart showing processing performed by the short range communication unit of the second embodiment.

FIG. 5 shows a flowchart showing processing performed by the short range communication unit 102 of the second embodiment. At the outset of operation, the remaining battery-capacity detection unit 260 first performs processing for checking remaining capacity of the authentication operation battery 400 (step S500). During the period of remaining battery-capacity check processing (step S500), it is determined whether or not the remaining battery-capacity (VBATT) surpasses the threshold value (VREF). As a consequence, when the remaining battery-capacity (VBATT) surpasses the threshold value (VREF) (YES in step S500), the power feed control unit 270 feeds electric power to the other module during authentication (step S310). Subsequently, the short range communication unit 230 performs authentication processing (step S320). In the meantime, when a result of remaining battery-capacity check processing (step S500) shows that the remaining battery-capacity (VBATT) does not surpass the threshold value (VREF) (NO in step S500), processing proceeds to authentication power supply wait processing (step S330), where processing waits until authentication electric power is supplied from another module. When authentication electric power is supplied from another module (YES in step S330), authentication processing is performed (step S320).

According to the present embodiment, it is possible to supply the short range communication unit 120 of the module to be authenticated with authentication electric power, without the electric power stored in the batteries 101 for activating the individual function units 111 to 151 being dissipated for authentication operation. Since the electric power stored in the batteries 101 for activating the individual function units 111 to 151 is not used for authentication operation, dissipation of electric power of the battery 101 of the module that plays a role to supply electric power during authentication operation is reduced, so that the individual function units 111 to 151 can be operated for a long hour. The configuration is also effective for the portable device 100 having in part a module that is difficult to perform authentication operation because of small capacity of its battery 101 or a module that does not have the authentication operation battery 400.

Third Embodiment

Figure 6:
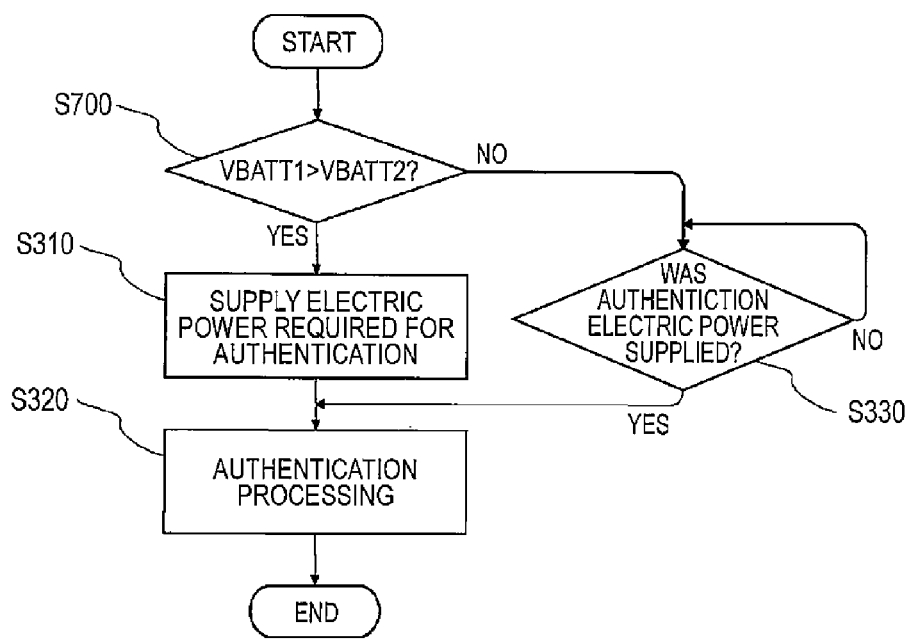
FIG. 6 shows a flowchart showing processing performed by the short range communication unit of a third embodiment.

FIG. 6 is a flowchart showing processing performed by the short range communication unit 102 of a third embodiment. The short range communication unit 102 is identical in configuration with its counterpart shown in FIG. 2 or 3. In the present embodiment, the remaining battery-capacity detection units 260 of the respective modules detect remaining battery-capacity (VBATT1) of the batteries 101 or 400 of the respective modules and exchange the thus-detected information abut remaining capacity with the other modules through non-contact short range communication, whereby remaining battery-capacity check processing (step S700) is performed. During processing (step S700) for checking remaining capacity of a battery, it is determined whether or not the remaining battery-capacity (VBATT1) of the module of interest surpasses remaining battery-capacity (VBATT2) of another module. As a consequence, when the remaining battery-capacity (VBATT1) of the module of interest surpasses the remaining battery-capacity (VBATT2) of the other module (YES in step S700), the power feed control unit 270 supplies authentication electric power to the other module (step S310). Subsequently, the short range communication unit 230 performs authentication processing (step S320). In the meantime, when the result of remaining battery-capacity check processing (step S700) shows that the remaining battery-capacity (VBATT1) of the module of interest does not surpass the remaining battery-capacity (VBATT2) of the other module (NO in step S700), processing proceeds to authentication power supply wait processing (step S330) and waits until authentication electric power is supplied from the other module. If authentication electric power is supplied from the other module (YES in step S330), authentication processing is performed (step S320).

According to the present embodiment, the module to be authenticated can avoid dissipation of electric power, which would otherwise arise during authentication, and hence the module to be authenticated can realize long-hour operation.

Fourth Embodiment

Figure 7:
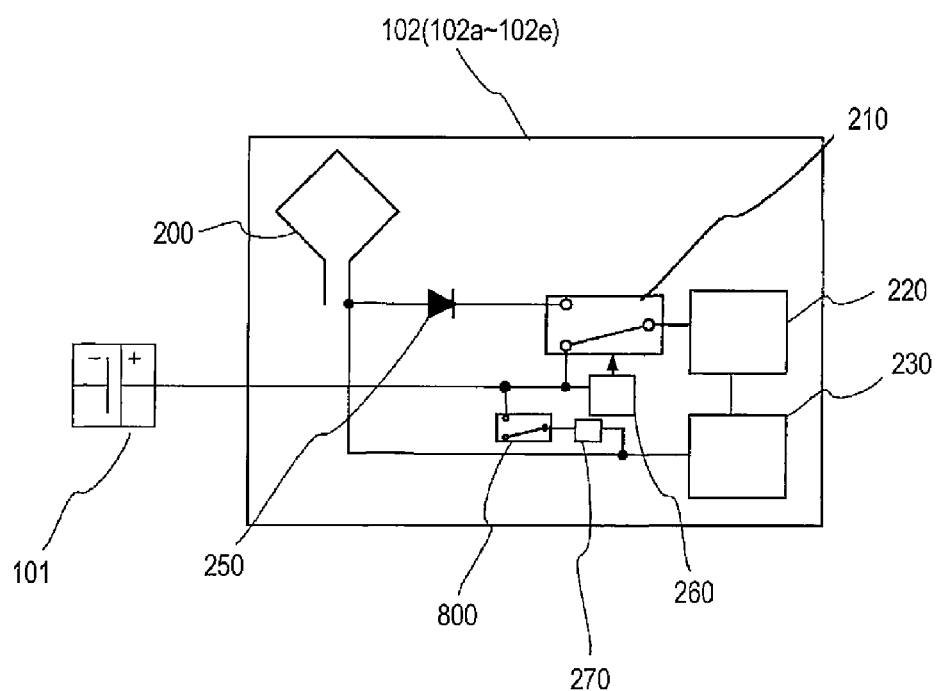
FIG. 7 shows a block diagram showing the short range communication unit of a fourth embodiment.

FIG. 7 shows a block diagram of the short range communication unit 102 of a fourth embodiment. The short range communication unit 102 of the fourth embodiment has an electric power supply switch 800 for making a switch as to whether or not to make it possible for the module of interest to supply authentication electric power to another module. The electric power supply switch 800 is switched between ON and OFF by means of a user's command. The remaining battery-capacity detection unit 260 detects remaining capacity of the battery 101 of the module of interest, exchanges information about remaining capacity with another module through non-contact short range communication, and mutually checks the remaining capacity of the battery 101. When the remaining capacity of the battery 101 of the module of interest surpasses the remaining capacity of the battery 101 of the other module and when the electric power supply switch 800 stays in the ON position, the power feed control unit 270 supplies electric power to the other module during authentication.

According to the present embodiment, when the remaining capacity of the battery of the module that needs authentication is identical with the remaining capacity of the battery of the module of interest, the electric power supply switch 800 is turned ON and OFF by means of a user's command. Dissipation of the electric power stored in the batteries 101 of the respective modules are thereby minutely controlled, so that the portable device 100 can be operated for a long hour by means of the electric power stored in the batteries 101.

Fifth Embodiment

Figure 8:
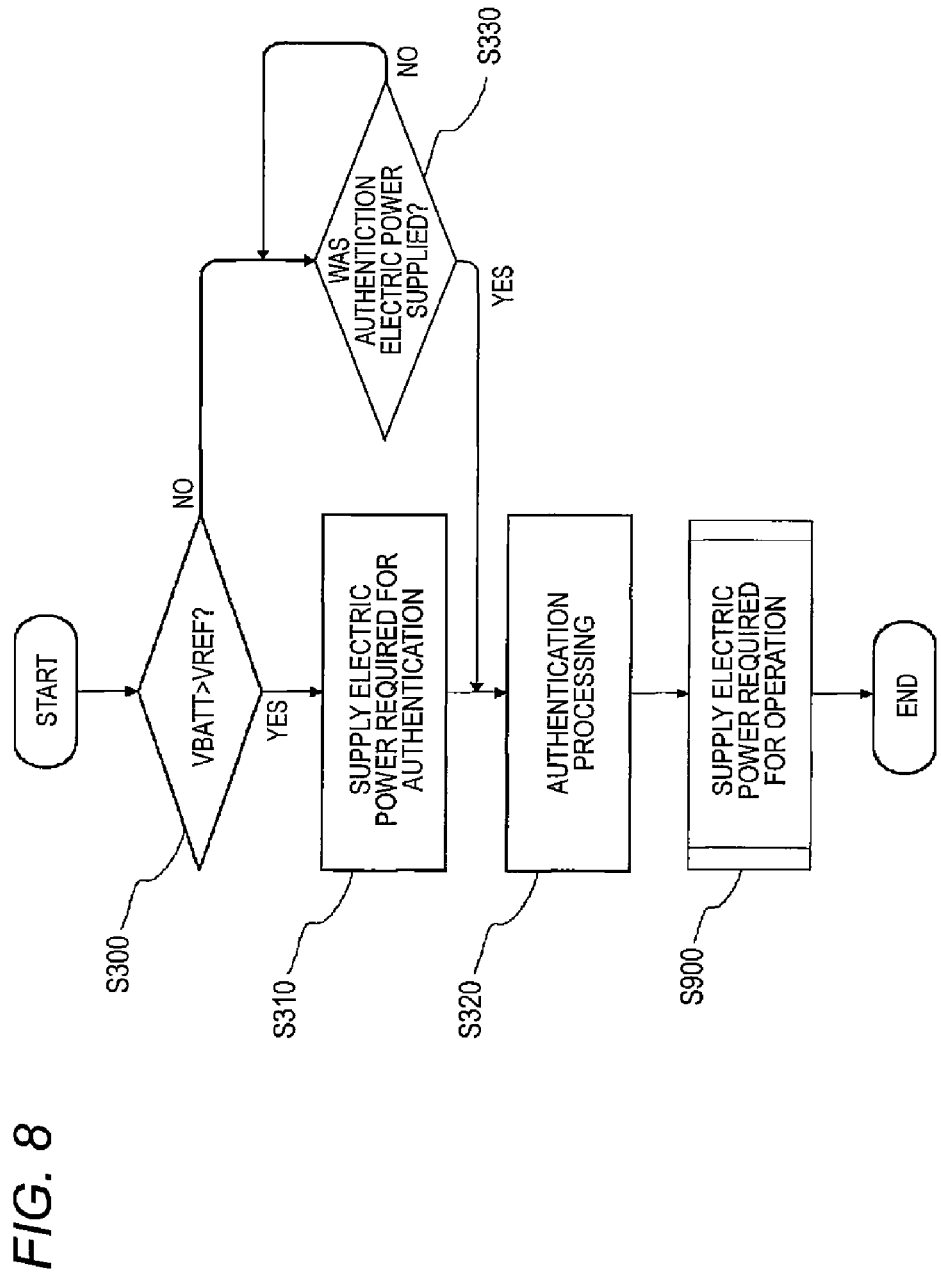
FIG. 8 shows a flowchart showing processing performed by the short range communication unit of a fifth embodiment.

FIG. 8 shows a flowchart showing processing performed by the short range communication unit 102 of a fifth embodiment. The short range communication unit 102 is identical in configuration with its counterpart shown in FIG. 2. In the fifth embodiment, after the short range communication unit 102 has performed authentication processing (step S320) along the flowchart shown in FIG. 3, the module of interest supplies the other module; namely, the module to be authenticated, with electric power necessary for operations of the individual function units, or the like, of the module to be authenticated (step S900).

According to the present embodiment, the module to be authenticated can acquire from the battery 101 of another module the electric power required for operations subsequent to authentication as well as the electric power required during authentication. The configuration is effective for the portable device 100 having a module that can hardly perform authentication operation because of small capacity of its battery 101 or a module that consumes a larger amount of electric power than that consumed by another module.

Sixth Embodiment

Figure 9:
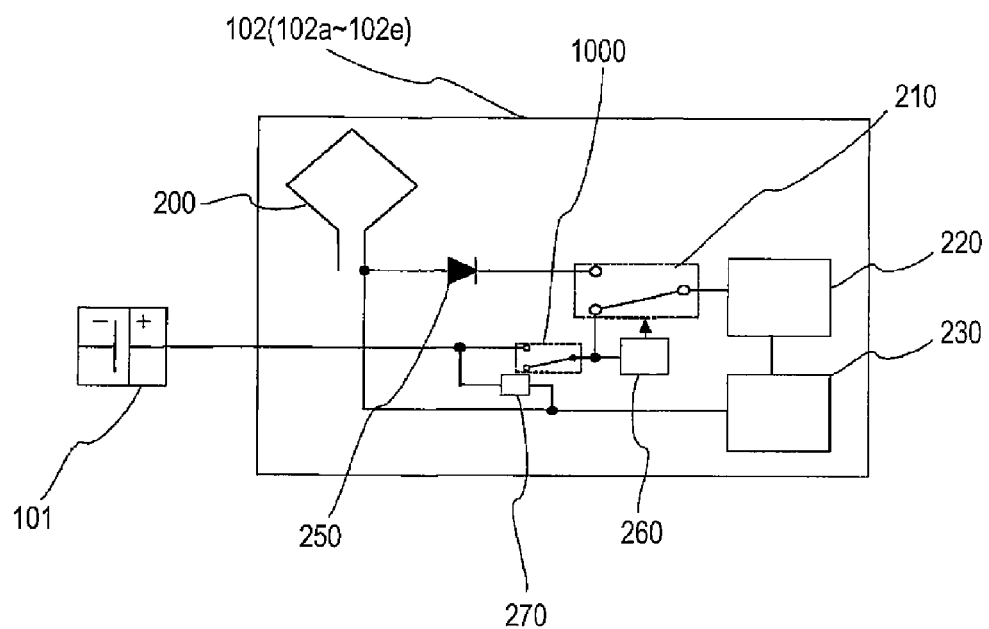
FIG. 9 shows a block diagram showing the short range communication unit of a sixth embodiment.

FIG. 9 shows a block diagram of the short range communication unit 102 of a sixth embodiment. The short range communication unit 102 of the sixth embodiment has a power switch 1000 for completely blocking a supply of electric power to the short range communication unit 102 of a module of interest when authentication operation does not need to be performed.

According to the present embodiment, the power switch 1000 is turned off when authentication operation is not required, thereby enabling performance of control in such a way that the minimum amount of inter-module authentication is performed only when required. Low power consumption of the portable device 100 can be realized.

Seventh Embodiment

Figure 10:
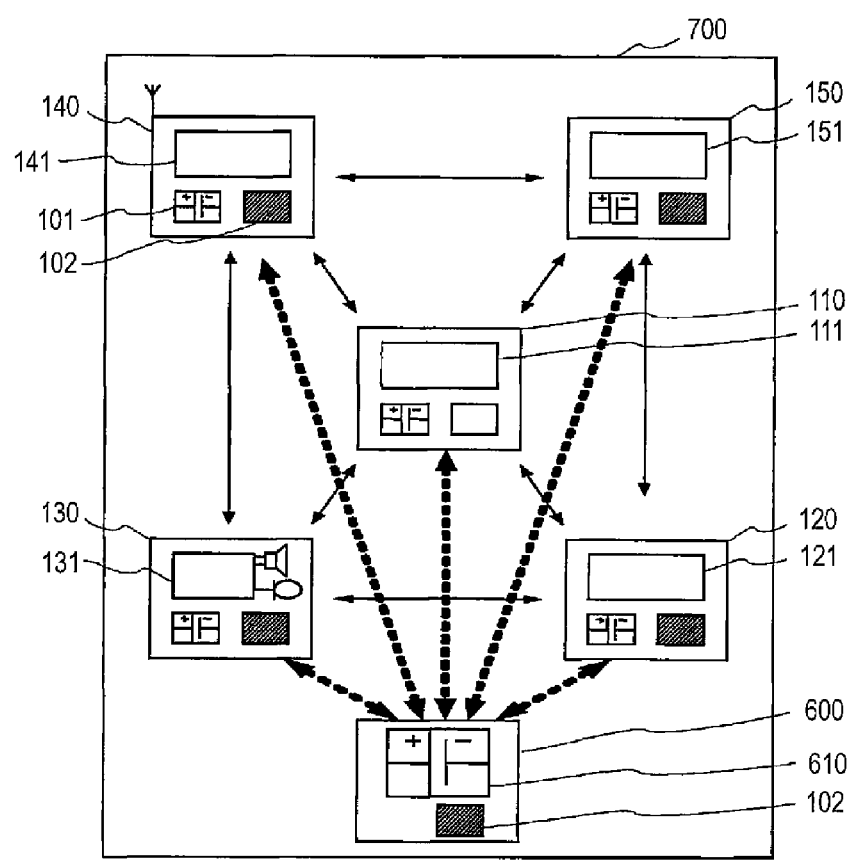
FIG. 10 shows a block diagram showing a portable device of a seventh embodiment of the present invention.

FIG. 10 shows a block diagram of a portable device 700 of a seventh embodiment. In addition to having the configuration shown in FIG. 1, the portable device 700 of the seventh embodiment further includes an authentication power supply module 600. The authentication power supply module 600 has a large capacity battery 610 for supplying electric power for authentication to another module and the short range communication unit 102. Specifically, five of a plurality of modules (six modules) making up the portable device 700 of the present embodiment are the modules 110 to 150 having the five individual function units 111 to 151. A remaining one module is the authentication power supply module 600. When a first module and a second module, among the five modules 110 to 150 having the individual function units 111 to 151, perform authentication processing through non-contact short range communication, the authentication power supply module 600 supplies both the first module and the second module or either of the modules with electric power for authentication operation.

According to the present embodiment, since the electric power stored in the batteries 101 (or the batteries 400 for authentication operation) belonging to the modules of the individual function units 111 to 151 is not used for authentication operation, dissipation of electric power of the batteries 101 belonging to the modules of the individual function units 111 to 151 is prevented, so that the individual function units 111 to 151 can be operated for a long hour. The configuration is effective for the portable device 100 having a module that can hardly perform authentication operation because of small capacity of its battery 101 or a module that does not have the battery 400 for authentication operation.

Eighth Embodiment

Figure 11:
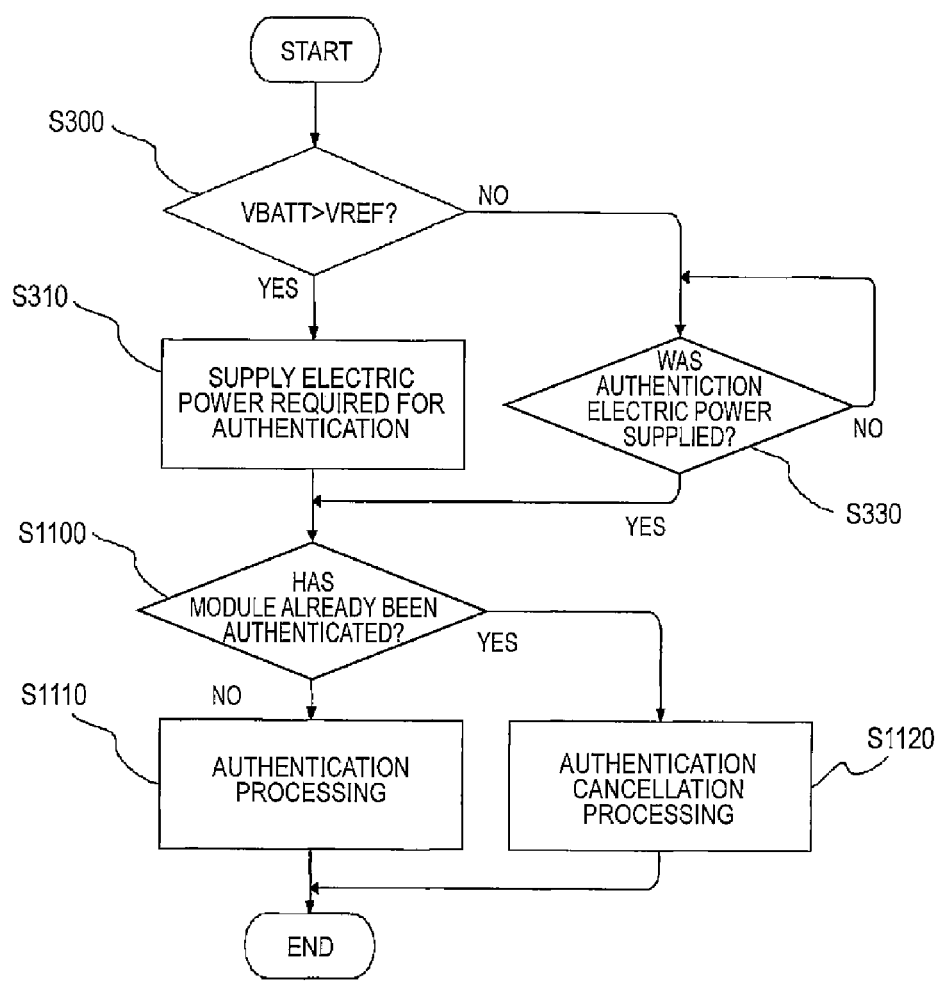
FIG. 11 shows a flowchart showing processing performed by the short range communication unit of an eighth embodiment.

FIG. 11 shows a flowchart showing processing performed by the short range communication unit 102 of an eighth embodiment. The present embodiment is premised on the first through seventh embodiments. In each of the short range communication units 102 of the respective modules, the remaining battery-capacity detection unit 260 subjects the battery 101 to remaining capacity check processing (step S300). When the remaining battery-capacity (VBATT) surpasses the threshold value (VREF) (YES in step S300), the power feed control unit 270 supplies the other module with authentication electric power (step S310). Subsequently, the short range communication unit 230 ascertains whether or not the other module has already been authenticated (step S1100). As a result, when the other module has not yet been authenticated (NO in step S1100), authentication processing is performed (step S1110). In the meantime, when the other module has already been authenticated (YES in step S1100), processing for canceling authentication can also be performed (step S1120). Alternatively, authentication can also be performed again (step S1110) as a result of the series of processing operations being again performed after authentication cancellation processing (step S1120).

According to the present embodiment, when the module to be authenticated has already been authenticated, authentication cancellation processing (step S1120) or second authentication processing (step S1110) is automatically performed. Therefore, easy removable attachment of the modules becomes feasible, and the convenience of the portable device 100 is further enhanced. Moreover, there is adopted a configuration for making it possible to select whether to maintain or cancel authentication of a module having functions analogous to functions of the authenticated module, through processing for authenticating a new module. It is thereby possible to prevent occurrence of a connection with a module having overlapping functions.

Ninth Embodiment

Figure 12:
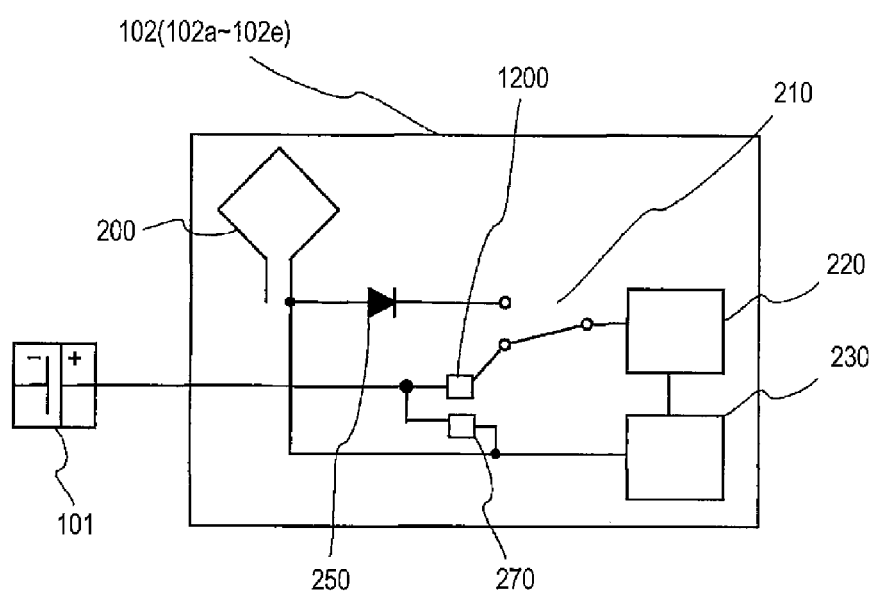
FIG. 12 shows a block diagram showing the short range communication unit of a ninth embodiment.
Figure 13:
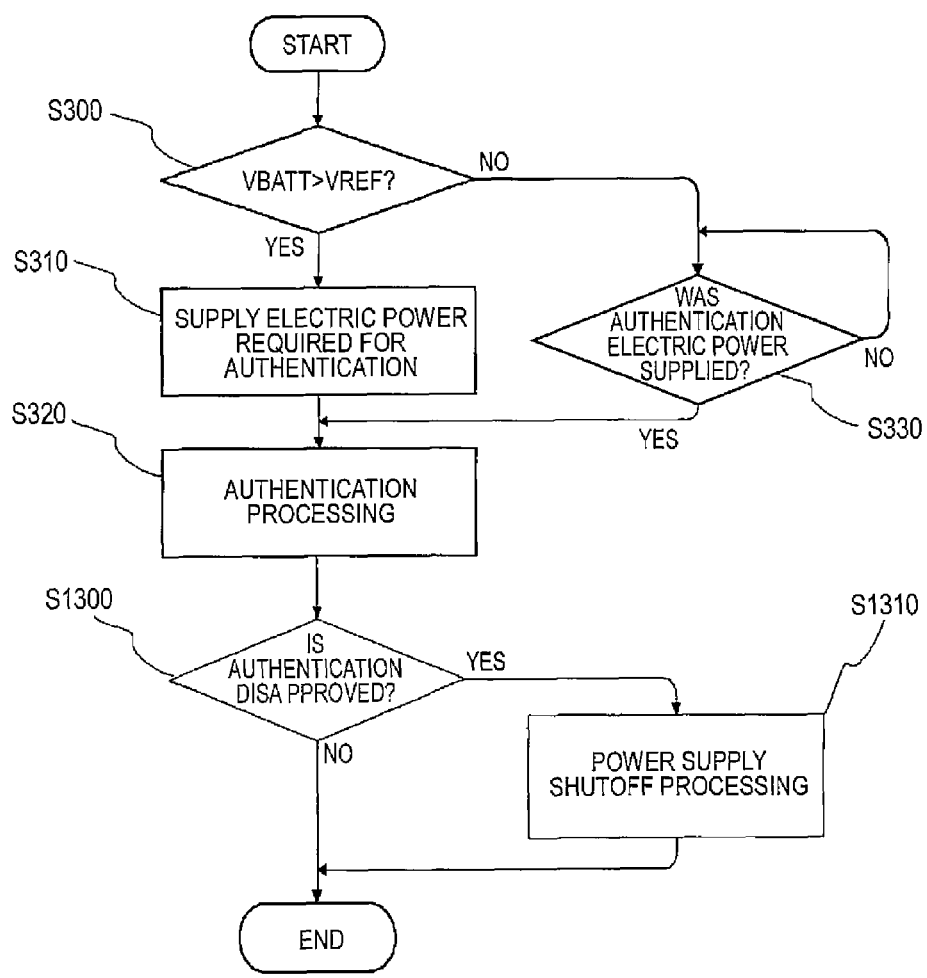
FIG. 13 shows a flowchart showing processing performed by the short range communication unit of the ninth embodiment.
Figure 14:
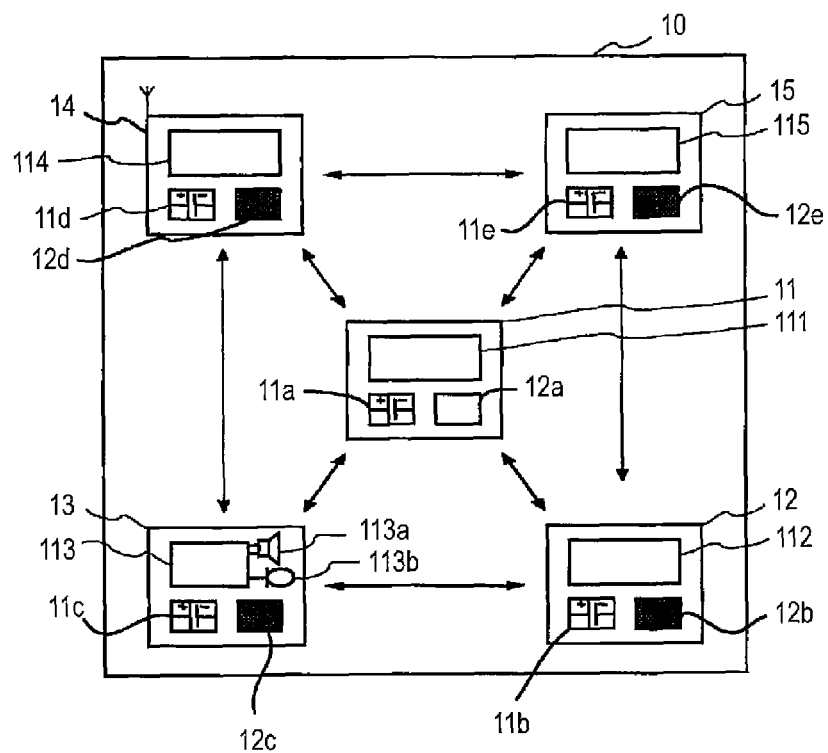
FIG. 14 shows a block diagram showing a portable device having a plurality of modules.

FIG. 12 shows a block diagram showing the short range communication unit 102 of a ninth embodiment. FIG. 13 shows a flowchart showing processing performed by the short range communication unit 102 of the ninth embodiment. The short range communication unit 102 of the present embodiment has a function of transmitting a disable command to a module to be authenticated when a result of performance of authentication processing (step S320) shows that the module to be authenticated is a fraudulent module, like a modified module or a stolen module, or when authentication is disapproved for another reason (YES in step S1300). The short range communication unit 102 of the present embodiment also has a function of shutting off a supply of electric power from the battery 101 of its own module when received the disable command (step S1310). When received the disable command, the short range communication unit 102 becomes completely inoperative because an electric power system is completely shut down as a result of activation of a power shut-off unit 1200 provided in the short range communication unit. As a consequence, the module incorporating the short range communication unit 102 can be fully disabled.

The embodiment makes it possible to prevent occurrence of a security threat, which would otherwise be caused by an fraudulent modified module, or yielding of a disadvantage, which would otherwise be yielded by use of a module illegally acquired by theft. Thus, system can be made safe.

Although the present invention has been described in detail or by reference to the specific embodiments, it is manifest to those skilled in the art that the present invention be susceptible to various modifications or alterations without departing the spirit and scope of the present invention.

The disclosure of Japanese Patent Application No. 2009-123172 filed May 21, 2009 including specification, drawings and claims is incorporated herein by reference in its entirety.

The present invention can also be applied to equipment built from a plurality of modules any one of which is a non-portable, floor-standing module.

What is claimed is:

1. A portable device, comprising:
a plurality of modules each of which includes a battery, an individual function unit configured to operate by electric power stored in the battery and exhibit individual functions, and a short range communication unit configured to perform an authentication operation through non-contact short-range communication, wherein:
when a first module and a second module of the plurality of modules start performing an authentication operation through the non-contact short range communication, the first module is configured to detect remaining capacity of a battery included in the first module,
when the detected remaining capacity is more than a predetermined level, the first module is configured to supply electric power to be used in performing the authentication operation to the second module, and
when the first module supplies electric power to the second module, the first module supplies electric power to the second module through the non-contact short range communication, and
after having supplied the electric power from the battery of the first module to the second module, thereby performing the authentication operation, the first module uses the electric power stored in the battery of the first module for an operation of the first module.

2. The portable device according to claim 1,
wherein, in addition to the battery storing the electric power used for activating the individual function unit, the first module further includes an authentication operation battery for activating the short range communication unit,
wherein, when the non-contact communication is established with the second module, remaining capacity of the authentication operation battery of the first module is detected, and
wherein, when the detected remaining capacity of the authentication operation battery of the first module is more than a predetermined level, the electric power used for performing the authentication operation is supplied from the authentication operation battery of the first module to the second module.

3. The portable device according to claim 1,
wherein each of the first module and the second module detects remaining capacity of its own battery, respectively, and information about the remaining capacity is exchanged between the first module and the second module through the non-contact short range communication, and
when the remaining capacity of the battery of the first module is greater than the remaining capacity of the battery of the second module, the first module supplies electric power used for performing the authentication operation to the second module, and when the remaining capacity of the battery of the second module is greater than the remaining capacity of the battery of the first module, the second module supplies electric power used for performing the authentication operation to the first module.

4. The portable device according to claim 3, wherein at least one of the first and second modules includes a switch used for making a switch whether or not to make it possible to supply the electric power for performing the authentication operation to another module.

5. The portable device according to claim 1, wherein at least one of the first and second modules includes a switch for shutting off a supply of electric power to the short range communication unit when the authentication operation does not need to be performed.

6. The portable device according to claim 1, wherein, when a result of authentication of the second module shows that the second module has already been authenticated, the first module cancels authentication of the second module.

7. The portable device according to claim 1,
wherein, when a result of authentication of the second module shows that the second module is disapproved, the first module transmits a disable command to the second module, and
wherein, when the second module receives the disable command, the second module shuts off a supply of electric power from the battery of the second module.

8. A portable device, comprising:
a plurality of modules each of which has a battery, an individual function unit configured to operate by electric power stored in the battery and exhibit individual functions, and a short range communication unit configured to perform authentication processing through non-contact short range communication, wherein:
at least one of the plurality of modules is an authentication power supply module,
when a first module and a second module, among the plurality of modules, perform an authentication operation through the non-contact short range communication, the authentication power supply module is configured to supply electric power for the authentication operation to at least one of the first module and the second module,
when the authentication power supply module supplies electric power to the at least one of the first module and the second module, the authentication power supply module supplies electric power to the at least one of the first module and the second module through the non-contact short range communication, and
when a result of authentication of the second module shows that the second module has already been authenticated, the first module cancels authentication of the second module.

9. The portable device according to claim 8,
wherein, when a result of authentication of the second module shows that the second module is disapproved, the first module transmits a disable command to the second module, and
wherein, when the second module receives the disable command, the second module shuts off a supply of electric power from the battery of the second module.

10. An electric power supply method performed by a portable device including a plurality of modules each of which has a battery, an individual function unit configured to operate by electric power stored in the battery and exhibit individual functions, and a short range communication unit configured to perform an authentication operation through non-contact short range communication, the method comprising:
when a first module and a second module of the plurality of modules perform an authentication operation through the non-contact short range communication, detecting, by the first module, remaining capacity of a battery included in the first module; and
when the detected remaining capacity of the battery of the first module is more than a predetermined level, supplying electric power for use in performing authentication operation from the first module to the second module,
wherein, when the first module supplies electric power to the second module, the first module supplies electric power to the second module through the non-contact short range communication, and
after having supplied the electric power from the battery of the first module to the second module, thereby performing the authentication operation, the first module uses the electric power stored in the battery of the first module for an operation of the first module.

11. The electric power supply method according to claim 10,
wherein, in addition to the battery storing the electric power used for activating the individual function unit, the first module further includes an authentication operation battery for activating the short range communication unit,
wherein, when the non-contact short range communication is established with the second module, remaining capacity of the authentication operation battery of the first module is detected, and
wherein, when the detected remaining capacity of the authentication operation battery of the first module is more than a predetermined level, the electric power used for performing the authentication operation is supplied from the authentication operation battery of the first module to the second module.

12. The electric power supply method according to claim 11,
wherein each of the first module and the second module detects remaining capacity of its own battery, respectively, and information about the remaining capacity is exchanged between the first module and the second module through the non-contact short range communication, and
when the remaining capacity of the battery of the first module is greater than the remaining capacity of the battery of the second module, the first module supplies electric power used for performing the authentication operation to the second module, and when the remaining capacity of the battery of the second module is greater than the remaining capacity of the battery of the first module, the second module supplies electric power used for performing the authentication operation to the first module.

13. The electric power supply method according to claim 12, wherein at least one of the first and second modules includes a switch used for making a switch whether or not to make it possible to supply the electric power for performing the authentication operation to the another module.

14. The electric power supply method according to claim 10, wherein at least one of the first and second modules shuts off a supply of electric power to the short range communication unit when the authentication operation does not need to be performed.

15. The electric power supply method according to claim 10,
wherein, when a result of authentication of the second module shows that the second module has already been authenticated, the first module cancels authentication of the second module.

16. The electric power supply method according to claim 10,
wherein, when a result of authentication of the second module shows that the second module is disapproved, the first module transmits a disable command to the second module, and
wherein, when the second module receives the disable command, the second module shuts off a supply of electric power from the battery of the second module.

17. An electric power supply method performed by a portable device including a plurality of modules each of which has a battery, an individual function unit configured to operate by electric power stored in the battery and exhibit individual functions, and a short range communication unit configured to perform an authentication operation through non-contact short range communication, wherein at least one of the plurality of modules is an authentication power supply module, the method comprising:
when a first module and a second module, among the plurality of modules, perform authentication processing through non-contact short range communication, supplying, by the authentication power supply module, electric power for the authentication operation to at least one of the first module and the second module through the non-contact short range communication,
wherein, when a result of authentication of the second module shows that the second module has already been authenticated, the first module cancels authentication of the second module.

18. The electric power supply method according to claim 17,
wherein, when a result of authentication of the second module shows that the second module is disapproved, the first module transmits a disable command to the second module, and
wherein, when the second module receives the disable command, the second module shuts off a supply of electric power from the battery of the second module.

19. A module for use in a portable device, the portable device including a plurality of modules, the module comprising:
a battery;
an individual function unit configured to operate by electric power stored in the battery and exhibit individual functions; and
a short range communication unit configured to perform an authentication process through non-contact short range communication, wherein:
the module is configured to detect remaining capacity of the battery of the module when the module starts authentication of another module,
when the detected remaining capacity of the module is more than a predetermined level, the module is configured to supply electric power for performing authentication operation to the another module,
when the module supplies electric power to the another module, the module supplies electric power to the another module through the non-contact short range communication, and
after having supplied the electric power from the battery of the module to the another module thereby performing the authentication operation, the module uses the electric power stored in the battery of the module for an operation of the module.

20. The module according to claim 19,
wherein, in addition to the battery storing the electric power used for activating the individual function unit, the modules further includes an authentication operation battery for activating the short range communication unit,
wherein, when the non-contact communication is established with the another module, the module detects remaining capacity of the authentication operation battery, and
wherein, when the detected remaining capacity of the authentication operation battery of the module is more than a predetermined level, the electric power used for performing the authentication operation is supplied from the authentication operation battery to the another module.

21. The module according to claim 20,
wherein the remaining capacity of the battery of the module and remaining capacity of a battery of the another module are detected, and information about the remaining capacities is exchanged with the another module through the non-contact short range communication, and
when the remaining capacity of the battery of the module is greater than remaining capacity of the battery of the another module, the module supplies electric power used for performing the authentication operation to the another module, and when the remaining capacity of the battery of the another module is greater than the remaining capacity of the battery of the module, the module receives electric power used for performing the authentication operation from the another.

22. The module according to claim 21, further comprising a switch used for making a switch whether or not to make it possible to supply the electric power for performing the authentication operation.

23. The module according to claim 21, further comprising a switch shutting off a supply of electric power to the short range communication unit when the authentication operation does not need to be performed.

24. The module according to claim 19, wherein, when a result of authentication of the another module shows that the another module has already been authenticated, the module cancels authentication of the another.

25. The module according to claim 19, wherein, when a result of authentication of the another module shows that the another module is disapproved, the module transmits a command for disabling use of the another module the another module.

26. A module for use in a portable device, the portable device including a plurality of modules, the module comprising:
   a battery;
   an individual function unit configured to operate by electric power stored in the battery and exhibit individual functions; and
   a short range communication unit for non-contact short range communication, wherein:
   when a first module and a second module of the plurality of modules other than the module perform an authentication process through non-contact short range communication, the module is configured to supply electric power for the authentication operation to at least one of the first module and the second module, and
   when the module supplies electric power to the at least one of the first module and the second module, the module supplies electric power to the at least one of the first module and the second module through the non-contact short range communication, and
   when a result of authentication of at least one of the first and second modules shows that the at least one of the first and second modules has already been authenticated, the module cancels authentication of the at least one of the first and second modules.

27. The module according to claim 26, wherein, when a result of authentication of at least one of the first and second modules shows that at least one of the first and second modules is disapproved, the module transmits a command for disabling use of at least one of the first and second modules to the at least one of the first and second modules.

* * * * *